(12) United States Patent
Luo

(10) Patent No.: US 8,830,198 B2
(45) Date of Patent: Sep. 9, 2014

(54) METHOD AND DEVICE FOR DYNAMICALLY GENERATING TOUCH KEYBOARD

(75) Inventor: Yijun Luo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 37 days.

(21) Appl. No.: 13/576,189

(22) PCT Filed: Feb. 24, 2011

(86) PCT No.: PCT/CN2011/071220
§ 371 (c)(1),
(2), (4) Date: Jul. 31, 2012

(87) PCT Pub. No.: WO2012/034378
PCT Pub. Date: Mar. 22, 2012

(65) Prior Publication Data
US 2012/0306759 A1      Dec. 6, 2012

(30) Foreign Application Priority Data

Sep. 13, 2010   (CN) .......................... 2010 1 0285046

(51) Int. Cl.
*G06F 3/041* (2006.01)
*G06F 3/048* (2013.01)
*G06F 3/0488* (2013.01)
*G06F 3/023* (2006.01)

(52) U.S. Cl.
CPC .......... *G06F 3/04886* (2013.01); *G06F 3/0233* (2013.01)
USPC .......................................... 345/173; 715/773

(58) Field of Classification Search
CPC .............. G06F 3/04886; G06F 3/0216; G06F 2203/0409; G06F 3/0426; H04N 21/42204; H04N 5/4403; H01H 9/0235; G01C 21/3664; B60K 2350/1004

USPC .................................. 345/168–173; 715/773
See application file for complete search history.

(56) References Cited

U.S. PATENT DOCUMENTS

2005/0225538 A1 * 10/2005 Verhaegh ....................... 345/173
2009/0146957 A1 *  6/2009 Lee et al. ....................... 345/168

FOREIGN PATENT DOCUMENTS

CN           1641538 A      7/2005
CN         101247228 A      8/2008
(Continued)

OTHER PUBLICATIONS

International Search Report in international application No. PCT/CN2011/071220, mailed on Jun. 23, 2011.

(Continued)

*Primary Examiner* — Dwayne Bost
*Assistant Examiner* — Christopher Kohlman
(74) *Attorney, Agent, or Firm* — Oppedahl Patent Law Firm LLC

(57) ABSTRACT

The disclosure discloses a method for dynamically generating a touch keyboard. The method includes that: a positioning point of a keyboard is dynamically generated according to number and position information of touch points of a finger of a user; an input area of each character of the keyboard is generated and adjusted according to the positioning points; and the input area is clicked to realize an input operation. The disclosure further discloses a device for dynamically generating a touch keyboard. By means of the method and the device, a keyboard is dynamically generated to input according to a touch of the user on a touch screen, and the keyboard can be adjusted according to ergonomics, so that an input efficiency of the user is greatly improved.

3 Claims, 3 Drawing Sheets

(56) References Cited

FOREIGN PATENT DOCUMENTS

| | | |
|---|---|---|
| CN | 101539838 A | 9/2009 |
| CN | 101770323 A | 7/2010 |
| CN | 101937313 A | 1/2011 |
| JP | 2004013381 A | 1/2004 |
| JP | 2005531861 A | 10/2005 |
| JP | 2011159089 A | 8/2011 |
| KR | 1020050016691 A | 2/2005 |
| KR | 20090060888 A | 6/2009 |
| WO | 2004006080 A2 | 1/2004 |

OTHER PUBLICATIONS

English Translation of the Written Opinion of the International Search Authority in international application No. PCT/CN2011/071220, mailed on Jun. 23, 2011.

Supplementary European Search Report in European application No. 11824449.0, mailed on Jan. 8, 2014.

* cited by examiner

METHOD AND DEVICE FOR DYNAMICALLY GENERATING TOUCH KEYBOARD

TECHNICAL FIELD

The disclosure relates to the field of multi-point touch screen input, and in particular to a method and a device for dynamically generating a touch keyboard and inputting.

BACKGROUND

A touch screen technology is applied to current electronic products more widely. The touch screen technology has many advantages that: man-computer operations, such as input, control or the like are more intuitive, and are convenient and rapid; and hardware accessories, such as keyboards, mice and the like, of electronic products are saved. Further, the touch screen technology is also favorable to make electronic products smaller, wherein a multi-point touch technology is a main development direction.

However, a general multi-point touch technology only can usually support two fingers to operate at the same time, and a maximum limit is to support five fingers. Therefore, under the limitations of hardware, a keyboard input realized by utilizing the touch screen has great limitations. Generally, display is performed in a fixed area of a touch screen in a fixed form. Then, the keyboard input is completed by clicking by a single hand of a user.

Recently, in the field of the multi-point touch technology, German researchers took preemptive opportunities. Germany Elektrosil and Citron companies jointly develop a touch technology (dreaMTouch) which can support 32 points and can track and process movement of all points. Problems of an error operation and the like generated by a plurality of fingers during a using process of a conventional multi-point touch screen are solved. Further, the dreaMTouch technology is also compatible with a SMART touch screen technology of a generation of windows; and a 4-millimeter glass interlay is also increased on a screen which can be connected with any computer through a Universal Serial Bus (USB) interface. In addition, the dreaMTouch technology can further detect a position, a pressure and a size of an object placed on a surface of the screen. Therefore, development companies hope that the dreaMTouch technology can become a popular human-computer interaction open-source standard.

SUMMARY

In view of the problem above, the main purpose of the present disclosure is to provide a method and a device for dynamically generating a touch keyboard and inputting, capable of solving a problem that an input position of a conventional touch-screen keyboard is too limited, namely a problem that the keyboard used for inputting is displayed in a fixed area in a fixed form.

In order to fulfill the purpose, the technical solution of the disclosure is realized as follows.

The disclosure provides a method for dynamically generating a touch keyboard and inputting, wherein the method includes that:

a positioning point of a keyboard is dynamically generated according to number and position information of touch points of a finger of a user;

an input area of each character of the keyboard is generated and adjusted according to the positioning point; and the input area is clicked to realize an input operation.

In the process of realizing an input operation, the method may further include that: after a finger leaves the positioning point to click an input area of a character, and when the finger returns to a touch screen and a new touch point serves as a positioning point again, an input area of a related key character, which is in the charge of the finger, is generated and adjusted according to the new touch point.

That a positioning point of a keyboard is dynamically generated according to number and position information of touch points may be that: the positioning point of the keyboard is dynamically generated when the number of the touch points meets a regulation of a threshold value and the position information among the touch points meets a preset rule.

That an input area of each character of the keyboard is generated and adjusted may be that: an input area of a character of the keyboard is generated according to a position of the positioning point and a preset keyboard format; and the input area of each character of the keyboard is adjusted according to a hand type for touch and according to ergonomics.

Before a positioning point of a keyboard is dynamically generated, the method may further include that: whether an area of a touch point meets a preset value range is determined, if the area meets the preset value range, the touch point is adopted, otherwise, it is determined that it is an error operation, and the touch point is not adopted.

That the input area is clicked to realize an input operation may be that: an input area of a key is rapidly clicked, and a touch point is left within a preset time; and when touch strength is greater than a preset threshold value, it is determined that the key corresponding to the input area is clicked.

The disclosure further provides a device for dynamically generating the touch keyboard and inputting, wherein the device includes a touch screen and a keyboard control module, wherein the touch screen, configured to detect number and position information of touch points of a fingers of a user, send the information to the keyboard control module, display an input area of a keyboard, and receive clicking aiming at the input area to realize an input operation; and the keyboard control module, is configured to dynamically generate a positioning point of the keyboard according to the number and the position information of the touch points, generate and adjust an input area of each character of the keyboard according to the positioning point, and send information of the input area of the keyboard to the touch screen.

The touch screen may further be configured to regenerate and adjust an input area of a related key character, which is in the charge of the finger, according to a new touch point, in the process of realizing the input operation by the touch screen and after the finger leaves the positioning point to click an input area of a character, and when the finger returns to the touch screen and the new touch point serves as a positioning point again.

In the method and the device for dynamically generating a touch keyboard and inputting, a positioning point of a keyboard is dynamically generated according to number and position information of touch points of a finger of a user; an input area of each character of the keyboard is generated and adjusted according to the positioning points; and the input area is clicked to realize an input operation until the inputting is ended, which realizes that a keyboard is dynamically generated to input according to a touch of the user on a touch screen and the keyboard is adjusted according to ergonomics, so that the input of the touch screen is more humanized and is more reasonable compared with an input of a conventional touch screen keyboard; since the keyboard meets an input habit of the user better, an input efficiency of the user is greatly improved, and the problem that a hand is easy to fatigue when the user inputs by using a conventional touch screen is solved.

DETAILED DESCRIPTION

The basic idea of the disclosure is that: a positioning point of a keyboard is dynamically generated according to number and position information of touch points of a finger of a user; an input area of each character of the keyboard is generated and adjusted according to the positioning point; and the input area is clicked to realize an input operation until inputting is ended.

The technical solution of the disclosure will be described in detail with reference to the accompanying drawings and embodiments hereinafter.

Figure 1:
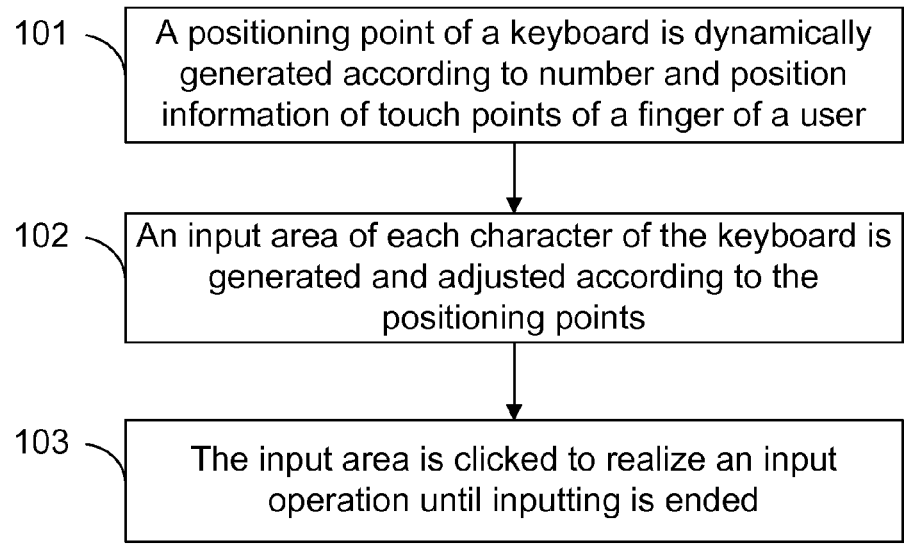
FIG. 1 is a flow diagram of a method for dynamically generating a touch keyboard and inputting according to the disclosure.
Figure 2:
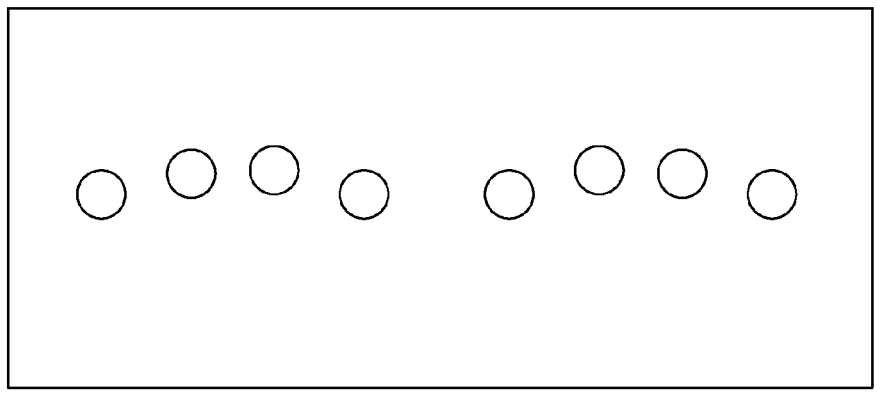
FIG. 2 illustrates a diagram of preset positions of eight touch points when two-handed input is performed according to the disclosure.

FIG. 1 shows a flow diagram of a method for dynamically generating a touch keyboard and inputting; and as shown in FIG. 1, the method for dynamically generating a touch keyboard and inputting specifically includes the following steps that:

Step 101: a positioning point of a keyboard is dynamically generated according to number and position information of touch points of a finger of a user;

specifically, when a finger is put on a touch screen, the touch screen can detect number and position information of touch points. A condition for dynamically generating the positioning point of the keyboard is that when the number of the touch points meets a regulation of a threshold value and the position information among the touch points meets a preset rule, it can be determined that a user hopes to generate a keyboard at the moment so as to realize an input operation. The threshold value of the number of the touch points can be set in accordance with single-handed input and two-handed input respectively according to a use habit of a user and a size of a screen of an application terminal. When the screen of the application terminal is large enough, a mode of supporting the single-handed input and the two-handed input can be selected; and when the screen of the application terminal is not large enough, a mode of only supporting the single-handed input can be selected. Preferably, a threshold value of supporting the single-handed input can be selected as four points or five points; and a threshold value of supporting the two-handed input can be selected as eight points, namely the eight points correspond to little fingers, ring fingers, middle fingers and index fingers of left and right hands respectively. Further, the preset rule of the position information among the touch points can be preset according to a placement distance and a relative position of the fingers when the single-handed input or the two-handed input is performed according to ergonomics, and the purpose is to determine that the user needs to perform an input operation at the moment. FIG. 2 illustrates a diagram of preset positions of eight touch points when two-handed input is performed according to the disclosure. As shown in FIG. 2, when number and position information of touch points meet a pattern of circle dots in the figure, it is determined that positioning points of a keyboard need to be generated according to the touch points.

Figure 3:
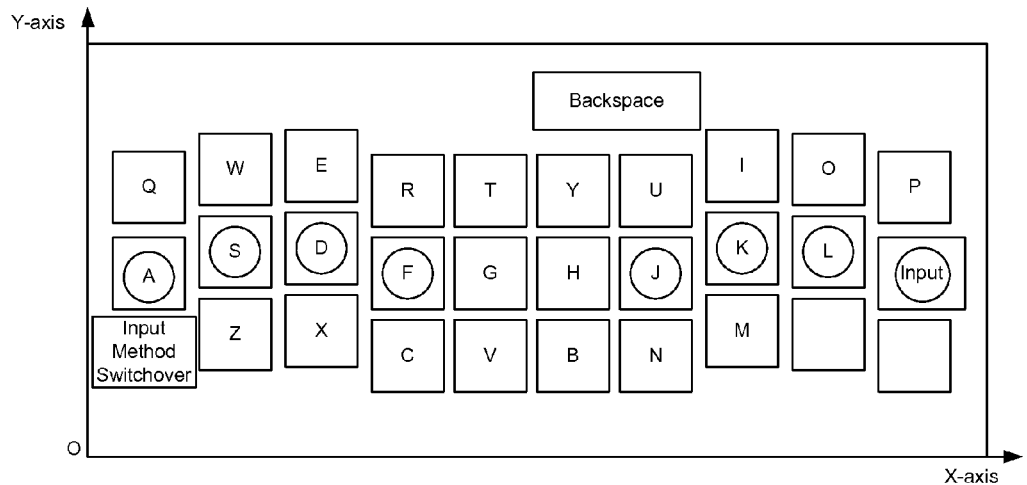
FIG. 3 illustrates a structural diagram of a keyboard generated by inputting eight points by two hands according to the disclosure.

The dynamically generating the positioning points of the keyboard is that when the number of the touch points meets a regulation of a threshold value and position information among the touch points meets a preset rule, the touch points serve as the positioning points of the generated keyboard. The positioning points of the keyboard can be preset according to an input method and an input habit which are used by a user commonly. FIG. 3 illustrates a structural diagram of a keyboard generated by inputting eight points by two hands according to the disclosure. As shown in the FIG. 3, the positioning points of the keyboard dynamically generated are as follows: a key A corresponding to a touch point of a little finger of a left hand; a key S corresponding to a touch point of a ring finger of the left hand; a key D corresponding to a touch point of a middle finger of the left hand; a key F corresponding to a touch point of an index finger of the left hand; a key J corresponding to a touch point of an index finger of a right hand; a key K corresponding to a touch point of a middle finger of the right hand; a key L corresponding to a touch point of a ring finger of the right hand; and a key Enter corresponding to a touch point of a little finger of the right hand.

Further, in order to avoid an error operation caused by a sleeve or collision, before the positioning point of the keyboard is dynamically generated according to the number and the position information of the touch points, the method further includes that a size of an area of the touch points is judged. A preferable solution is to set a value range of an area of a touch point; when the size of the area of the touch point is within the value range, it is indicated that the touch point is generated by the touch of the finger and the touch point can be adopted; and when the size of the touch point area is out of the value range, it is indicated that the touch point may be generated by an error operation and the touch point is not adopted.

Step 102: an input area of each character of the keyboard is generated and adjusted according to the positioning points;

specifically, that an input area of each character of the keyboard is generated according to the positioning points includes that: input areas of other characters are generated according to a preset keyboard format based on the positioning points. As shown in FIG. 3, input areas of other characters refer to other keys besides the keys A, S, D, F, J, K, L and Enter. The input areas of the keys in FIG. 3 adopt a commonly used square, but in practical application, the square can be replaced with other shapes, such as a circular shape. When an input area is generated, a size of the input area can adopt a preset size, or a distance between adjacent positioning points can be calculated, and an average distance or a minimum distance serves as an input area of each key. Preferably, the generated input area can be displayed as a semitransparent effect so as to avoid sheltering the other display contents of the touch screen.

Figure 4:
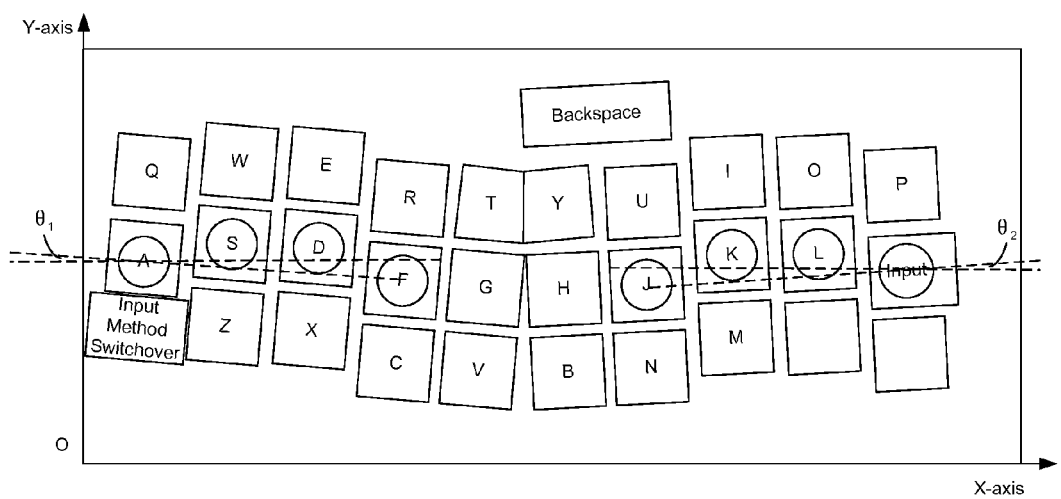
FIG. 4 illustrates a structural diagram of an input area after a keyboard dynamically generated by inputting eight points by two hands is adjusted according to the disclosure.

That the input area of each character of the keyboard is adjusted includes that: the input area of each character of the keyboard is adjusted according to a hand type for touch, so that a user uses the keyboard which is dynamically generated according to the disclosure more comfortably. The adjustment can be slightly rotating the keyboard, and/or rising and lowering the input area of the key, and/or adjusting a key layout. For example, when a left hand or a right hand is placed on the touch screen, usually the positions of the little finger, the ring finger and the middle finger are risen gradually and the position of the index finger is lowered suddenly, so that the keys which are in charge of the left hand are inclined slightly clockwise to meet ergonomics; and in a similar way, the keys which are in charge of the right hand are inclined slightly anticlockwise. FIG. 4 illustrates a structural diagram of an input area after a keyboard dynamically generated by inputting eight points by two hands is adjusted according to the disclosure. As shown in FIG. 4, all keys, which are in charge of the left hand, are inclined clockwise, and the keys, which are in charge of the right hand, are inclined anticlockwise.

During the process of generating and adjusting the input area of each character of the keyboard, it is possible that input areas of adjacent keys are overlapped; and at the moment, the input areas of the adjacent keys is separated by a vertical central line in an overlapped area. As shown in FIG. 4, the key T and the key Y have an overlapped area, and the input areas of the two keys are separated by a vertical central line of the overlapped area.

Step 103: the input area is clicked to realize an input operation until inputting is ended;

specifically, in an input process, an input area of a certain key of a touch screen is clicked rapidly, a finger leaves a touch point within a preset time, and when touch strength is greater than a preset threshold, it is determined that the key corresponding to the input area is clicked to realize an input operation. Wherein, performing determination according to the preset threshold value of the touch strength is to prevent the error operation which may be caused by an inherent input habit of a user. For example, a user hopes to input letters U and N successively; first, the index finger of the right hand leaves a positioning point J to click the key U, then, the index finger of the right hand returns to the original positioning point to slightly touch the key J according to an input habit, and finally the index finger of the right hand clicks the key N; and at the moment, by determining the preset threshold value of the touch strength, it can be avoided that the key J is input by mistake when the finger returns to an original position to slightly touch the key J.

It is noted that a finger must leave an original positioning point to perform a click operation in an input process, at the moment, input areas of respective characters generated previously should be remained all the time, and then the input area can be clicked to complete an input operation. Further, after each finger leaves the positioning point to click other keys, and when the finger returns to the touch screen and a new touch point serves as a positioning point again, it cannot be guaranteed that the finger returns to the original position absolutely. Therefore, an input area of a character of a related key, which is in the charge of the finger, can be regenerated and adjusted according to the new touch point; and the specific generation and adjustment modes are the same as those in Step 102. As shown in FIG. 4, the related keys, which are in the charge of the little finger of the left hand, include Q, A and Input Method Switchover; the related keys, which are in the charge of the ring finger of the left hand, include W, S and Z; the related keys, which are in the charge of the middle finger of the left hand, include E, D and X; the related keys, which are in the charge of the index finger of the left hand, include R, F, C, T, G and V; the related keys, which are in the charge of the index finger of the right hand, include Y, H, B, U, J and N; the related keys, which are in the charge of the middle finger of the right hand, include I, K and M; the related keys, which are in the charge of the ring finger of the right hand, include O and L; and the related keys, which are in the charge of the little finger of the right hand, include P and Enter.

Modes of determining that inputting is ended includes: a mode of a preset specific area on the touch screen, and/or a mode that all fingers leave positioning points at the same time. The modes of determining that inputting is ended can be freely selected by a user according to a personal habit of the user.

Figure 5:
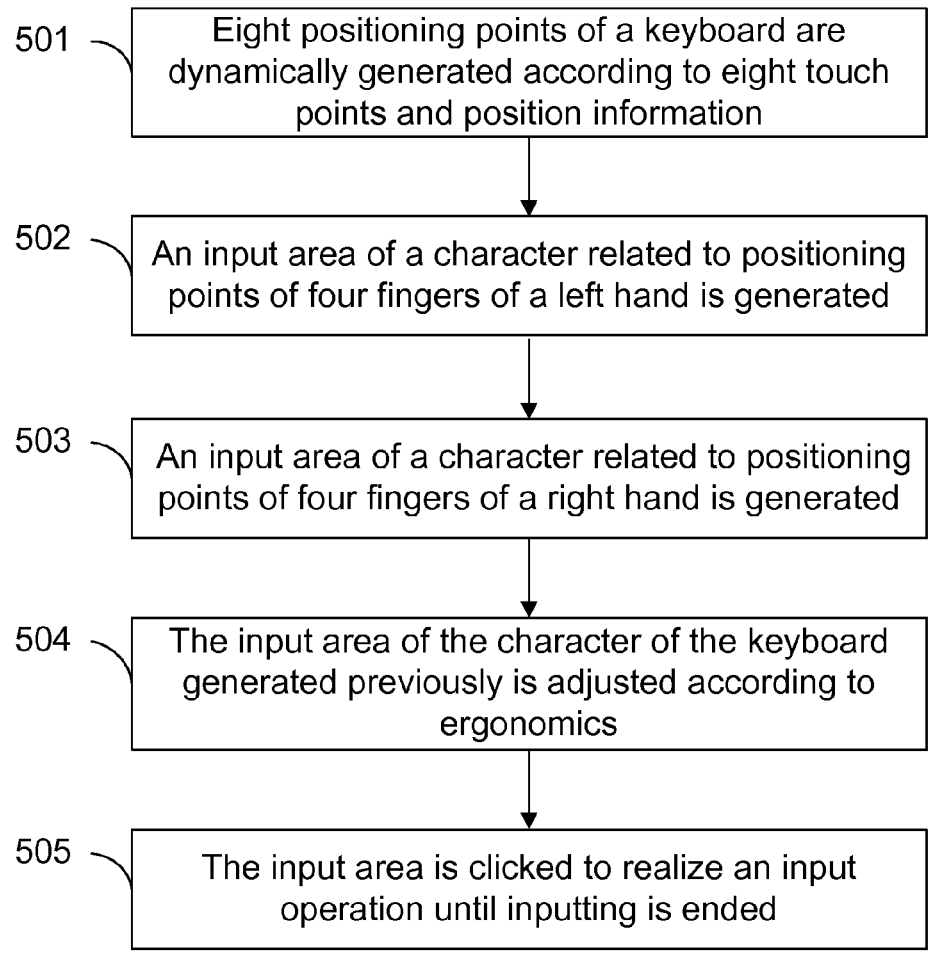
FIG. 5 illustrates a flow diagram of a method for dynamically generating a keyboard by inputting eight points by two hands and inputting according to the disclosure.

FIG. 5 illustrates a flow diagram of a method for dynamically generating a keyboard by inputting eight points by two hands and inputting according to the disclosure. As shown in FIG. 5, the method specifically includes the following steps that:

Step 501: eight positioning points of a keyboard are dynamically generated according to eight touch points and position information;

specifically, eight fingers including index fingers, middle fingers, ring fingers and little fingers of two hands are placed on a touch screen; the touch screen captures position information of eight positioning touch points; when the eight positioning touch points meet positions shown in FIG. 2, eight positioning points of a keyboard are generated according to the eight positioning touch points, specifically, a touch point of the little finger of the left hand corresponds to a key A; a touch point of the ring finger of the left hand corresponds to a key S; a touch point of the middle finger of the left hand corresponds to a key D; a touch point of the index finger of the left hand corresponds to a key F; a touch point of the index finger of the right hand corresponds to a key J; a touch point of the middle finger of the right hand corresponds to a key K; a touch point of the ring finger of the right hand corresponds to a key L; and a touch point of the little finger of the right hand corresponds to a key Enter.

Step 502: an input area of a character related to positioning points of four fingers of a left hand is generated;

specifically, as shown in FIG. 3, a coordinate system O is established by taking a bottom left corner of the screen as an original point, a horizontal direction as an X-axis and a vertical direction as a Y-axis; an average distance from the key A to the key S, from the key S to the key D, from the key D to the key F, from the key J to the key K, from the key K to the key L, from the key L to the key Enter is calculated according to coordinates of the eight positioning points in the coordinate system, and is set as |d|; an input area of the key A is a square area, wherein the touch point A is taken as a center, |d| is taken as a side length, and a bottom side is parallel to the X-axis; an input area of the key Q is obtained by upwards moving |d| from the input area of the key A; an input area of the key Input Method Switchover is obtained by downwards moving |d| from the input area of the key A; in a similar way, an input areas of the keys S, W, Z, D, E, X, F, R and C can be obtained; an input area of G is obtained by rightwards moving |d| from the input area of the key F; an input area of T is obtained by rightwards moving |d| from the input area of the key R; and an input area of the key V is obtained by rightwards moving |d| from the input area of the key C.

Step 503: an input area of a character related to positioning points of four fingers of a right hand is generated;

specifically, the input area of the character related to the positioning point of the four fingers of the right hand are generated according to the same method of Step 502. As shown in FIG. 3, an input area of the key Backspace is a rectangular area, wherein a length of the rectangular area is 2|d| and a width of the rectangular area is |d|; and a left sideline of the rectangular area is aligned with a left sideline of the input area of the key Y, and a lower sideline is |d|/3 away from an upper sideline of the input area of the key Y and is parallel to the X-axis.

Step 504: the input area of the character of the keyboard generated previously is adjusted according to ergonomics;

specifically, as shown in FIG. 4, an adjustment performed aiming at the keys which are in the charge of the left hand includes that: a slope |k1| of a straight line passing through the key A and the key F is obtained according to the coordinates of the key A and the key F in the coordinate system O; it can be known from a trigonometric function that $tg\theta_1=|k1|$, and an inclination angle $\theta_1$ is solved; the input area of the character is adjusted according to the dimension of $\theta_1$; the three input areas of the keys Q, A and Input Method Switchover are rotated $\alpha+(\theta_1-90°)$ degrees clockwise around the key A, wherein $\alpha$ is a variable value; the dimension of $\alpha$ can be adjusted by a user through a user interface to change a rotation degree of the input area of the keyboard, so that an optimal input state of the user per se can be achieved.

In a similar way, the three input areas of the keys W, S and Z are rotated $\alpha+(\theta_1-90°)$ degrees clockwise around the key S; the three input areas of the keys E, D and X are rotated $\alpha+(\theta_1-90°)$ degrees clockwise around the key D; and the six input areas of the keys R, F, C, T, G and V are rotated $\alpha+(\theta_1-90°)$ degrees clockwise around the key F.

An adjustment performed aiming at the keys which are in the charge of the right hand includes that: a slope |k2| of a straight line passing through the key J and the key Enter is obtained according to coordinates of the keys J and Enter in the coordinate system O; it can be known from a mathematical theory that $tg\theta_2=|k2|$, $\theta_2$ is solved; the three input areas of the keys P, Enter and a blank key are rotated $\alpha+(\theta_2-90°)$ degrees anticlockwise around the key Enter; the three input areas of the keys O, L and a blank key are rotated $\alpha+(\theta_2-90°)$ degrees anticlockwise around the key L; the three input areas of the keys I, K and M are rotated $\alpha+(\theta_2-90°)$ degrees anticlockwise around the key K; and the seven input areas of the keys U, J, N, Y, H, B and Backspace are rotated $\alpha+(\theta_2-90°)$ degrees anticlockwise around the key J.

Further, if input areas of some characters are too close to an edge of the touch screen to be displayed completely, then the input areas of the some characters are a part of input areas which can be displayed by the screen; and if input areas of some characters are overlapped, then the input areas of the some characters are separated by a center line of an overlapped area.

Step 505: the input area is clicked to realize an input operation until inputting is ended;

specifically, in an input process, some fingers may leave the touch screen at the same time; at the moment, the input area and the display of each character of the keyboard are still not changed, when the moved fingers return to the touch screen and the touch points serve as the positioning points, the input areas of the related characters of the keyboard are regenerated in the aforementioned mode according to the positions of the new positioning points. Preferably, it can further be prescribed that when two keys are clicked at the same time, it is considered as an error operation by default and thus inputting cannot be performed. When the fingers of the eight positioning points all leave the touch screen, inputting is ended and the picture and the program before the keyboard is generated is returned to.

Figure 6:
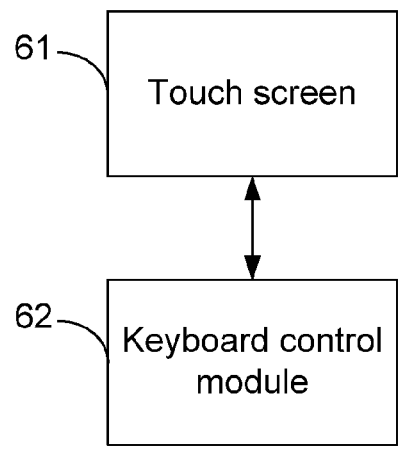
FIG. 6 illustrates a structural diagram of a device for dynamically generating a touch keyboard and inputting according to the disclosure.

FIG. 6 illustrates a structural diagram of a device for dynamically generating a touch keyboard and inputting according to the disclosure; as shown in FIG. 6, the device for dynamically generating a touch keyboard and inputting includes a touch screen 61 and a keyboard control module 62, wherein the touch screen 61, is configured to detect number and position information of touch points of a fingers of a user, send the information to the keyboard control module 62, display an input area of a keyboard, and receive clicking aiming at the input area to realize an input operation until inputting is ended; and specifically, when a finger is put on a touch screen 61, the touch screen 61 can detect number and position information of touch points. A condition for dynamically generating the positioning point of the keyboard is that when the number of the touch points meets a regulation of a threshold values and the position information among the touch points meets a preset rule, it can be determined that a user hopes to generate a keyboard at the moment, and thus the information is sent to the keyboard control module 62. The threshold value of the number of the touch points can be set in accordance with single-handed input and two-handed input according to a use habit of a user and a size of a screen of an application terminal. When the screen of the application terminal is large enough, a mode of supporting the single-handed input and the two-handed input can be selected; and when the screen of the application terminal is not large enough, a mode of only supporting the single-handed input can be selected. Preferably, a threshold value of supporting the single-handed input can selected as four points or five points; and a threshold value of supporting the two-handed input can selected as eight points, namely the eight points correspond to little fingers, ring fingers, middle fingers and index fingers of left and right hands respectively. Further, the preset rule of the position information among the touch points can be preset according to a placement distance and a relative position of the fingers when the single-handed input or the two-handed input is performed according to ergonomics, and the purpose is to determine that the user needs to perform an input operation at the moment.

The dynamically generating the positioning points of the keyboard is that when the number of the touch points meets a regulation of a threshold value and position information among the touch points meets a preset rule, the touch points serve as the positioning points of the generated keyboard. The positioning points of the keyboard can be preset according to an input method and an input habit which are used by a user commonly.

Further, in order to avoid an error operation caused by a sleeve or collision, before the positioning point of the keyboard is dynamically generated according to the number and the position information of the touch points, the method further includes that a size of an area of the touch points is judged. A preferable solution is to set a value range of an area of a touch point; when the size of the area of the touch point is within the value range, it is indicated that the touch point is generated by the touch of the finger and the touch point can be adopted; and when the size of the touch point area is out of the value range, it is indicated that the touch point may be generated by an error operation and the touch point is not adopted.

In an input process, an input area of a certain key of the touch screen 61 is clicked rapidly, a finger leaves a touch point within a preset time, and when touch strength is greater than a preset threshold, it is determined that the key corresponding to the input area is clicked to realize an input operation. Wherein, performing determination according to the preset threshold value of the touch strength is to prevent the error operation which may be caused by an inherent input habit of a user.

It is noted that a finger must leave an original positioning point to perform a click operation in an input process, at the moment, input areas of respective characters generated previously should be remained all the time, and then the input area can be clicked to complete an input operation. Further, after each finger leaves the positioning point to click other keys, and when the finger returns to the touch screen 61 and a new touch point serves as a positioning point again, it cannot be guaranteed that the finger returns to the original position absolutely. Therefore, an input area of a character of a related key, which is in the charge of the finger, can be regenerated and adjusted according to the new touch point; specifically, the touch screen 61 sends information of the new touch point to the keyboard control module 62, and the keyboard control module 62 dynamically generates a new positioning point of the keyboard, generates and adjusts input areas of related keys which are in charge of the finger according to the new positioning point, and sends information of the new input areas to the touch screen 61. As shown in FIG. 4, the related keys, which are in the charge of the little finger of the left hand, include Q, A and Input Method Switchover; the related keys, which are in the charge of the ring finger of the left hand, include W, S and Z; the related keys, which are in the charge of the middle finger of the left hand, include E, D and X; the related keys, which are in the charge of the index finger of the left hand, include R, F, C, T, G and V; the related keys, which are in the charge of the index finger of the right hand, include Y, H, B, U, J and N; the related keys, which are in the charge of the middle finger of the right hand, include I, K and M; the related keys, which are in the charge of the ring finger of the right hand, include O and L; and the related keys, which are in the charge of the little finger of the right hand, include P and Enter.

Modes of determining that inputting is ended includes: a mode of a preset specific area on the touch screen 61, and/or a mode that all fingers leave positioning points at the same time. The modes of determining that inputting is ended can be freely selected by a user according to a personal habit of the user.

The keyboard control module 62, is configured to dynamically generate a positioning point of the keyboard according to the number and the position information of the touch points, generate and adjust an input area of each character of the keyboard according to the positioning point, and send information of the input area of the keyboard to the touch screen 61.

Specifically, that an input area of each character of the keyboard is generated according to the positioning points includes that: input areas of other characters are generated according to a preset keyboard format based on the positioning points. As shown in FIG. 3, input areas of other characters refer to other keys besides the keys A, S, D, F, J, K, L and Enter. The input areas of the keys in the FIG. 3 adopt a commonly used square, but in practical application, the square can be replaced with other shapes, such as a circular shape. When an input area is generated, a size of the input area can adopt a preset size, or a distance between adjacent positioning points can be calculated, and an average distance or a minimum distance serves as an input area of each key. Preferably, the generated input area can be displayed as a semitransparent effect so as to avoid sheltering the other display contents of the touch screen.

That the input area of each character of the keyboard is adjusted includes that: the input area of each character of the keyboard is adjusted according to a hand type for touch, so that a user uses the keyboard which is dynamically generated according to the disclosure more comfortably. For example, when a left hand or a right hand is placed on the touch screen, usually the positions of the little finger, the ring finger and the middle finger are risen gradually and the position of the index finger is lowered suddenly, so that the keys which are in charge of the left hand are inclined slightly clockwise to meet ergonomics; and in a similar way, the keys which are in charge of the right hand are inclined slightly anticlockwise.

During the process of generating and adjusting the input area of each character of the keyboard, it is possible that input areas of adjacent keys are overlapped; and at the moment, the input areas of the adjacent keys is separated by a vertical central line or a middle line in an overlapped area.

The above are only the preferred embodiments of the disclosure and not intended to limit the scope of protection of the disclosure, and any modification, equivalent replacement, improvement and the like within the spirit and principle of the disclosure shall fall within the scope of protection of the disclosure.

The invention claimed is:

1. A method for dynamically generating a touch keyboard and inputting, comprising:
generating, dynamically, positioning points of a keyboard, when the number of touch points of a user's fingers meets a threshold value and a placement distance and a relative positive of the touch points meets a preset rule;
establishing a coordinate system O by taking a bottom left corner of the screen as an original point, a horizontal direction as an X-axis and a vertical direction as a Y-axis; calculating an average distance between adjacent positioning points according to coordinates of the positioning points in the coordinate system; and generating an input area of each character of the keyboard according to the positioning points;
wherein the input area of the key corresponding to the first positioning point is a square area with a center of the first positioning point and a side length of the average distance between adjacent positioning points and a bottom side paralleling to the X-axis; the input areas of other characters are generated by upwards moving or downwards moving or rightwards moving the average distance from the input area of the first positioning point;
adjusting the input area of the character of the keyboard generated previously;
wherein an adjustment performed aiming at the keys which are in the charge of the user's left hand comprises: calculating a slope $|k1|$ of a straight line passing through the keys which are in charge of the little finger and the index finger of the left hand respectively, and an inclination angle $\theta_1$ corresponds to $|k1|$; and the input area of the keys which in charge of the left hand are rotated $\alpha+(\theta_1-90°)$ degrees clockwise around each positioning point of the left hand respectively, wherein $\alpha$ is a variable value; and
the keys which are in charge of the right hand are rotated anticlockwise in a similar way as the adjustment of the keys which are in charge of the user's left hand;
receiving an input operation in response to the user's clicking on the input area.

2. The method according to claim 1, further comprising: before dynamically generating a positioning point of a keyboard, determining whether an area of a touch point meets a preset value range, if the area meets the preset value range, adopting the touch point, otherwise, determining that it is an error operation, and not adopting the touch point.

3. A device for dynamically generating a touch keyboard and inputting, comprising a touch screen and a keyboard control module, wherein
- the touch screen, is configured to detect the number and a placement distance and a relative position of touch points of a user's fingers, send an detection result to the keyboard control module, display an input area of a keyboard, and receive an input operation in response to the user's clicking on the input area; and
- the keyboard control module, is configured to receive the detection result from the touch screen, and dynamically generate positioning points of the keyboard, when the number of touch points of a user's fingers meets a threshold value and the placement distance and the relative position of the touch points meets a preset rule; and to generate and adjust an input area of each character of the keyboard according to the positioning points, and send information of the input area of the keyboard to the touch screen,
    - wherein the keyboard control module is configured to generate an input area of each character of the keyboard comprises: establishing a coordinate system O by taking a bottom left corner of the screen as an original point, a horizontal direction as an X-axis and a vertical direction as a Y-axis; calculating an average distance between adjacent positioning points according to coordinates of the positioning points in the coordinate system; and the input area of the key corresponding to the first positioning point is a square area with a center of the first positioning point and a side length of the average distance between adjacent positioning points and a bottom side paralleling to the X-axis; the input areas of other characters are generated by upwards moving or downwards moving or rightwards moving the average distance from the input area of the first positioning point; and
- the keyboard control module is configured to adjust the input area of the character of the keyboard generated preciously comprises: calculating a slope $|k1|$ of a straight line passing through the keys which are in charge of the little finger and the index finger of the left hand respectively, and an inclination angle $\theta_1$ corresponds to $|k1|$; and the input area of the keys which in charge of the left hand are rotated $\alpha+(\theta_1-90°)$ degrees clockwise around each positioning point of the left hand respectively, wherein $\alpha$ is a variable value; and the keys which are in charge of the right hand are rotated anticlockwise in a similar way as the adjustment of the keys which are in charge of the user's left hand.

* * * * *